Dec. 23, 1941.  L. WILLIAMS  2,266,933
ARTICLE FEEDING APPARATUS
Filed Feb. 14, 1940
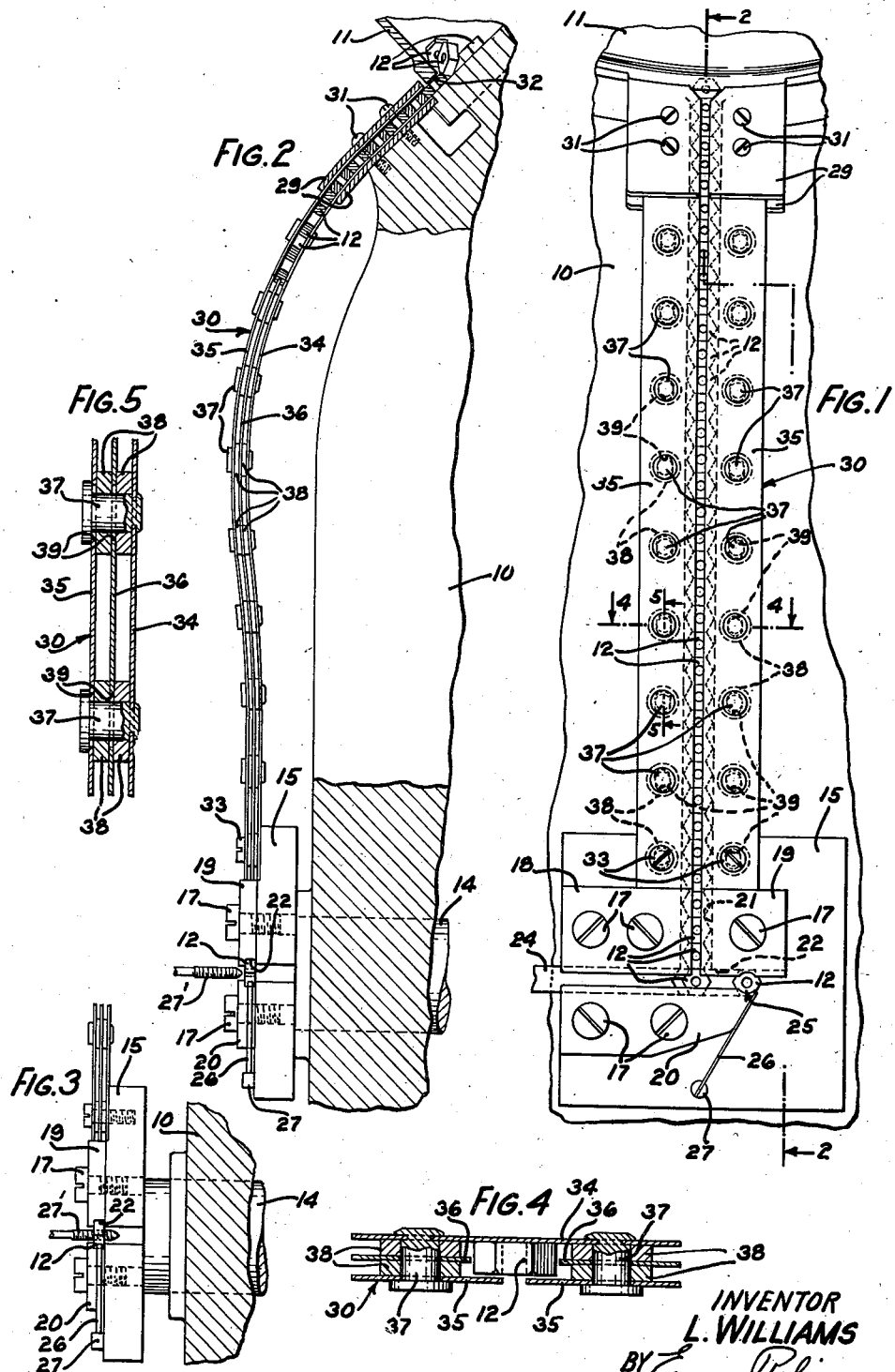
INVENTOR
L. WILLIAMS
BY Emery Robinson
ATTORNEY Patented Dec. 23, 1941

2,266,933

UNITED STATES PATENT OFFICE 2,266,933

ARTICLE FEEDING APPARATUS

Lorris Williams, Brookfield, Ill., assignor to Western Electric Company, Incorporated, New York, N. Y., a corporation of New York Application February 14, 1940, Serial No. 318,813

5 Claims. (Cl. 10—162)

This invention relates to article feeding apparatus, and more particularly to apparatus for supplying nut blanks to nut tapping machines of the type in which a reciprocatory platen feeds the nut blanks onto a rotating tap.

An object of the invention is to provide a simple, inexpensive and efficient apparatus for supplying articles to a reciprocatory article feeding member or the like.

In accordance with the above object, one embodiment of the invention contemplates the provision of an apparatus for supplying nut blanks to the reciprocatory platen of a nut tapping machine, the apparatus comprising a flexible gravity chute having its receiving end attached to a fixed support in position to receive the nut blanks from a supply hopper, and its delivery end attached to the reciprocatory platen.

A preferred embodiment of the invention is illustrated in the accompanying drawing, in which Fig. 1 is a front elevational view of a portion of a nut tapping mechine equipped with a blank feeding apparatus embodying the invention;

Fig. 2 is a vertical sectional view taken on line 2—2 of Fig. 1, with the reciprocatory platen shown in its retracted position;

Fig. 3 is a fragmentary sectional view similar to Fig. 2, with the nut feeding platen shown in its advanced position;

Fig. 4 is an enlarged cross-sectional view taken of line 4—4 of Fig. 1, and

Fig. 5 is an enlarged fragmentary vertical section taken on line 5—5 of Fig. 1.

Referring to the drawing, there is illustrated in Figs. 1 and 2 a portion of a nut tapping machine comprising a stationary frame 10, near the upper end of which there is supported a hopper 11 for containing a supply of nut blanks 12, 12. A horizontally reciprocable piston 14 is mounted in the lower portion of the frame and a platen 15 is attached to the forward end of the piston. Removably attached by screws 17, 17 to the front surface of the platen are two upper guide plates 18 and 19 and a lower guide plate 20. The upper guide plates have their adjacent edges undercut and spaced apart to provide therebetween a vertical passageway 21 (Fig. 1) for accommodating a vertical stack of nut blanks 12. The lower guide plate 20 is spaced below the two upper guide plates and the adjacent edges of the upper and lower guide plates are undercut to provide a horizontal passageway 22 joining the bottom end of the vertical passageway. By removing the screws 17, the guide plates may be removed and replaced by other guide plates for accommodating nut blanks of different sizes.

From the vertical passageway 21 the nut blanks are fed by gravity into the horizontal passageway 22, along which a reciprocatory pusher bar 24 advances the blanks, one at a time, to the tapping position indicated in Fig. 1 by the reference numeral 25. A flat spring 26 is attached at one end to a pin 27 and its free end serves as a yieldable stop for insuring proper alignment of the nut blanks with a rotating tap 27', a portion of which is shown in Figs. 2 and 3. Upon reciprocation of the platen 15 by any suitable means (none shown) the nut blank in the tapping position is fed onto the rotating tap, as shown in Fig. 3, and is then withdrawn therefrom upon reversal of direction of rotation of the tap.

A flexible magazine or gravity chute 30 is provided for conducting the blanks from the supply hopper to the reciprocatory platen 15 and into the vertical passageway 21. The upper or receiving end of this flexible chute is removably attached by means of mounting plates 29, 29 and screws 31, 31 to the stationary frame 10 in position to receive the nut blanks from the discharge slot 32 of the hopper. The discharge end of the gravity chute is removably attached by screws 33 to the reciprocatory platen 15 in position to guide the blanks into the vertical passageway 21 between guide plates 18 and 19. The chute is composed of flexible metal strips so that it is capable of bending or flexing intermediate its ends upon reciprocation of the platen.

As best shown in Figs. 4 and 5, the chute comprises a flexible sheet metal back plate 34, a front wall composed of two spaced flexible metal strips 35—35, and a pair of flexible metal guide strips 36—36 intermediate the front wall and the back plate, the several parts being assembled and held together by means of a plurality of shouldered rivets 37, 37. Spacing washers 38, 38 are provided on the rivets for spacing the front and guide strips from the back plate in accordance with the thickness of the nut blanks. The rivets are rigidly secured to the back plate, and the front and guide strips 35 and 36 have elongated holes 39, 39 loosely fitting the rivets on which the front and guide strips are free to shift endwise relative to the back plate, thereby permitting the bending or flexing of the complete magazine or chute.

In the operation of the apparatus, the nut blanks are placed in the hopper 11 and, if necessary, are agitated therein in any suitable manner to promote the discharge of properly positioned blanks into the upper end of the flexible gravity chute 30. The blanks are guided by the flexible chute into the vertical passageway 21, which directs them into the horizontal passageway 22 on the reciprocatory platen 15. The reciprocatory pusher bar 24 advances the blanks, one at a time, to the tapping position 25 (Fig. 1) and during each forward movement of the platen the blank in the tapping position is fed onto the rotating tap 27. After the tapping operation, the direction of rotation of the tap is reversed and simultaneously therewith the platen is retracted, whereby the tapped nut blank is withdrawn from the tap. The pusher bar then advances the next nut blank to the tapping position, thereby ejecting the previously tapped blank by pushing it past the upper end of stop spring 26. This completes one cycle of operation of the apparatus and the cycle is automatically repeated as long as nut blanks are delivered to the reciprocatory platen by the flexible chute 30. Thus, the tapping operation may continue uninterruptedly, it being necessary only to occasionally replenish the supply of blanks in the hopper 11. The reciprocatory movement of the platen 15 merely causes a bending or flexing of the chute 30, which does not break or interrupt the continuous line or stack of blanks extending from the hopper to the platen.

Although the invention is herein illustrated and described as particularly applicable for use in conjunction with a nut tapping machine, it is to be understood that the novel features of the invention are capable of other applications within the scope of the appended claims.

What is claimed is:

1. An article feeding apparatus, comprising a stationary member, a movable member, and a flexible article guiding member having one end attached to the stationary member and its opposite end attached to the movable member, said guiding member comprising two flexible strips maintained in spaced apart relationship for the passage of articles therebetween, one of said strips being capable of endwise movement with respect to the other strip.

2. An article feeding apparatus, comprising a stationary support, a reciprocatory article feeding member, and a flexible article guiding member having its receiving end attached to the support and its discharge end attached to the reciprocatory member, said guiding member comprising spaced parallel walls composed of flexible material, and means for holding said walls in spaced apart relationship without preventing a limited amount of relative endwise movement thereof.

3. In an apparatus for feeding articles to a reciprocatory member, a stationary support, and a flexible article guiding chute having one end attached to the support and its opposite end attached to the reciprocatory member, said chute comprising front and rear walls composed of flexible strip material, one of said walls being capable of endwise movement with respect to the other wall.

4. In an apparatus for feeding articles to a reciprocatory member, a flexible gravity chute for guiding the articles to said member, said chute having front and rear walls composed of flexible strip material, and means for holding said strips in spaced apart relationship without preventing a limited amount of relative endwise movement of said strips.

5. In an apparatus for feeding articles to a reciprocatory member, a flexible gravity chute for guiding the articles to said member, said chute having spaced apart front and rear walls and intermediate spaced apart guide strips composed of flexible sheet material, and means comprising a plurality of shouldered rivets for holding the front and rear walls and the guide strips in spaced apart relationship, said rivets being rigidly secured to the rear wall and said front wall and guide strips having elongated holes loosely fitting the rivets, whereby the front wall and guide strips are capable of endwise movement relative to the rear wall.

LORRIS WILLIAMS.